July 12, 1932.  F. G. FEELEY  1,867,402
SHEARING MECHANISM
Filed Feb. 24, 1927  10 Sheets-Sheet 1

INVENTOR.
BY
ATTORNEYS.

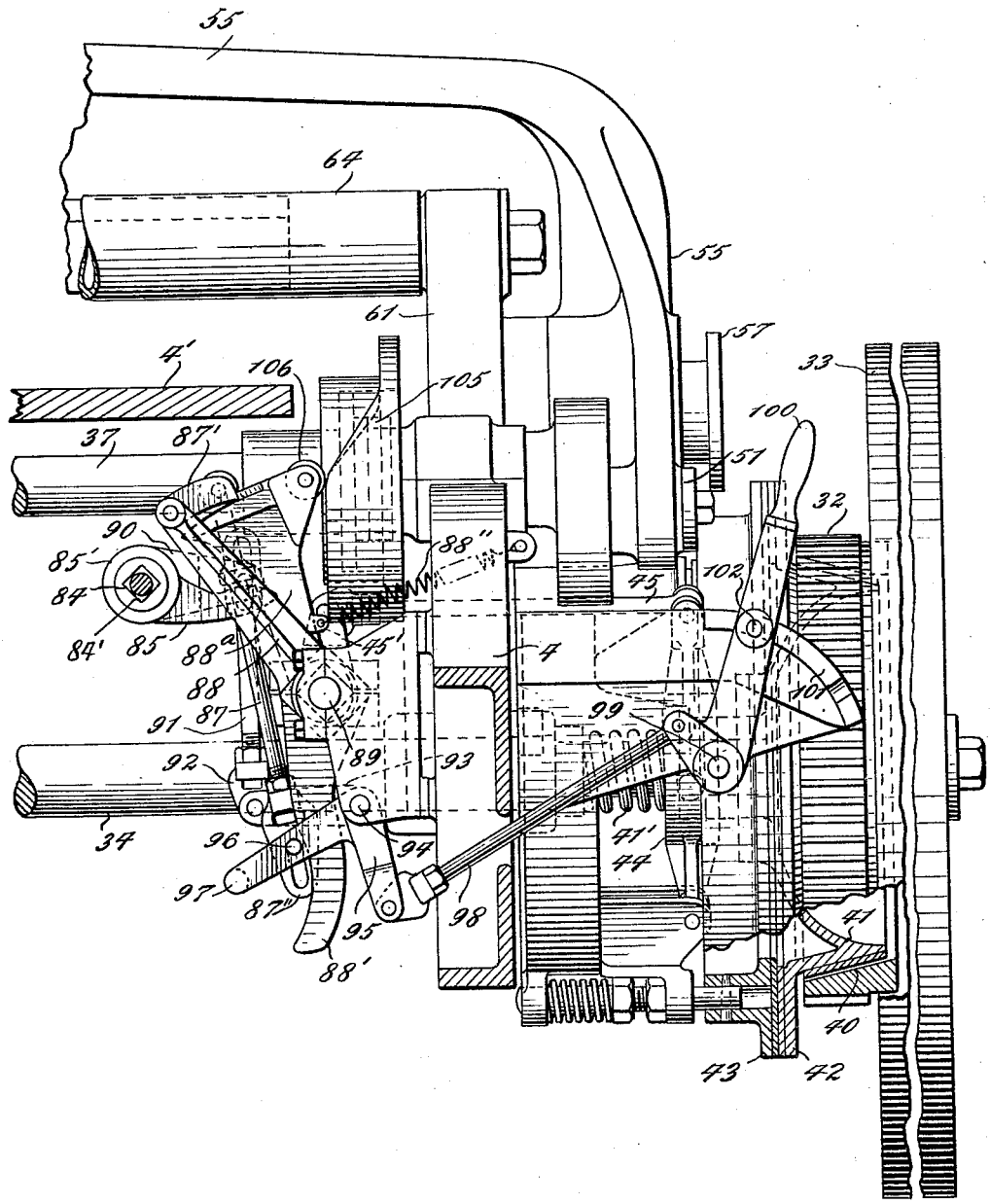

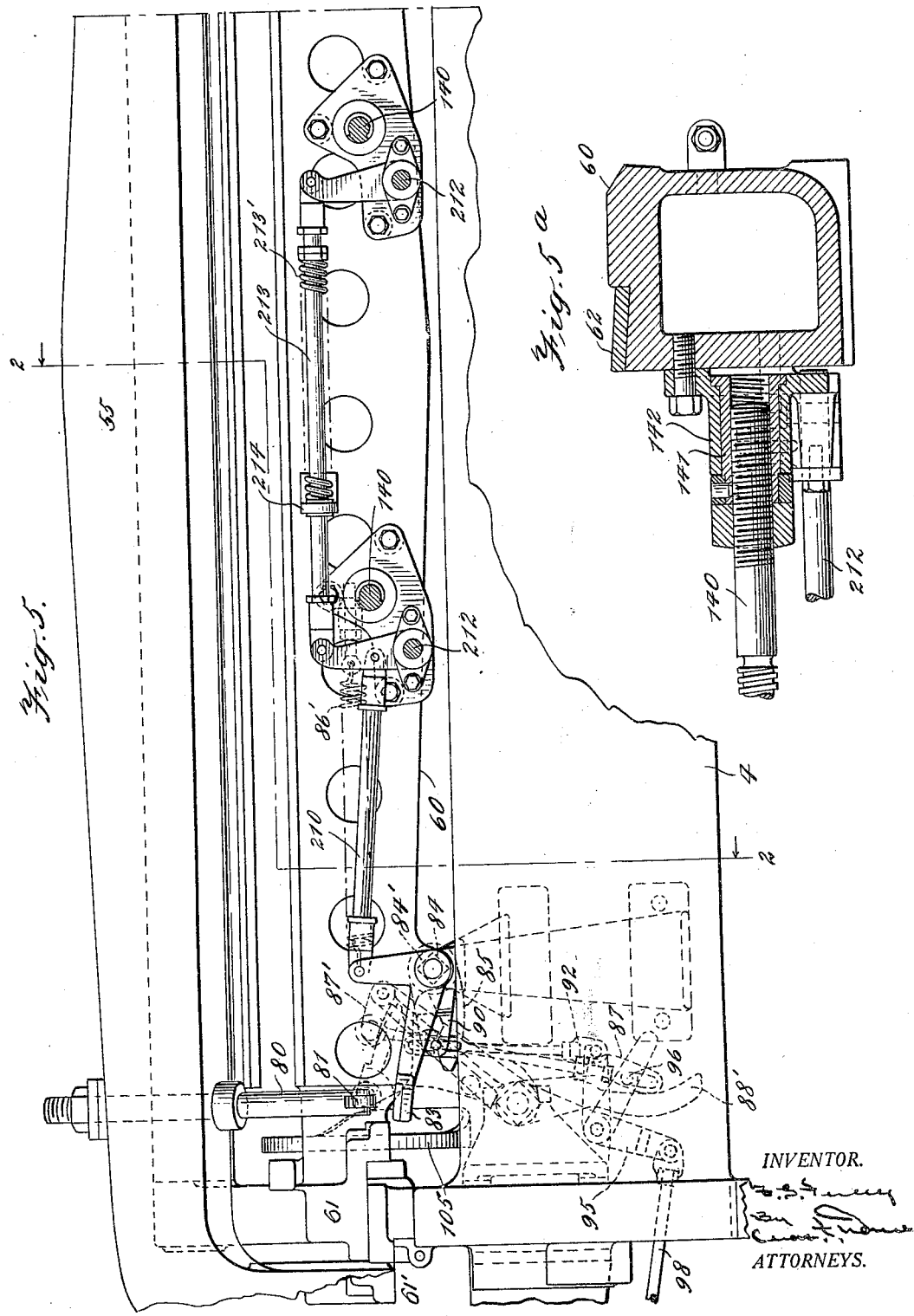

July 12, 1932. F. G. FEELEY 1,867,402
SHEARING MECHANISM
Filed Feb. 24, 1927 10 Sheets-Sheet 6
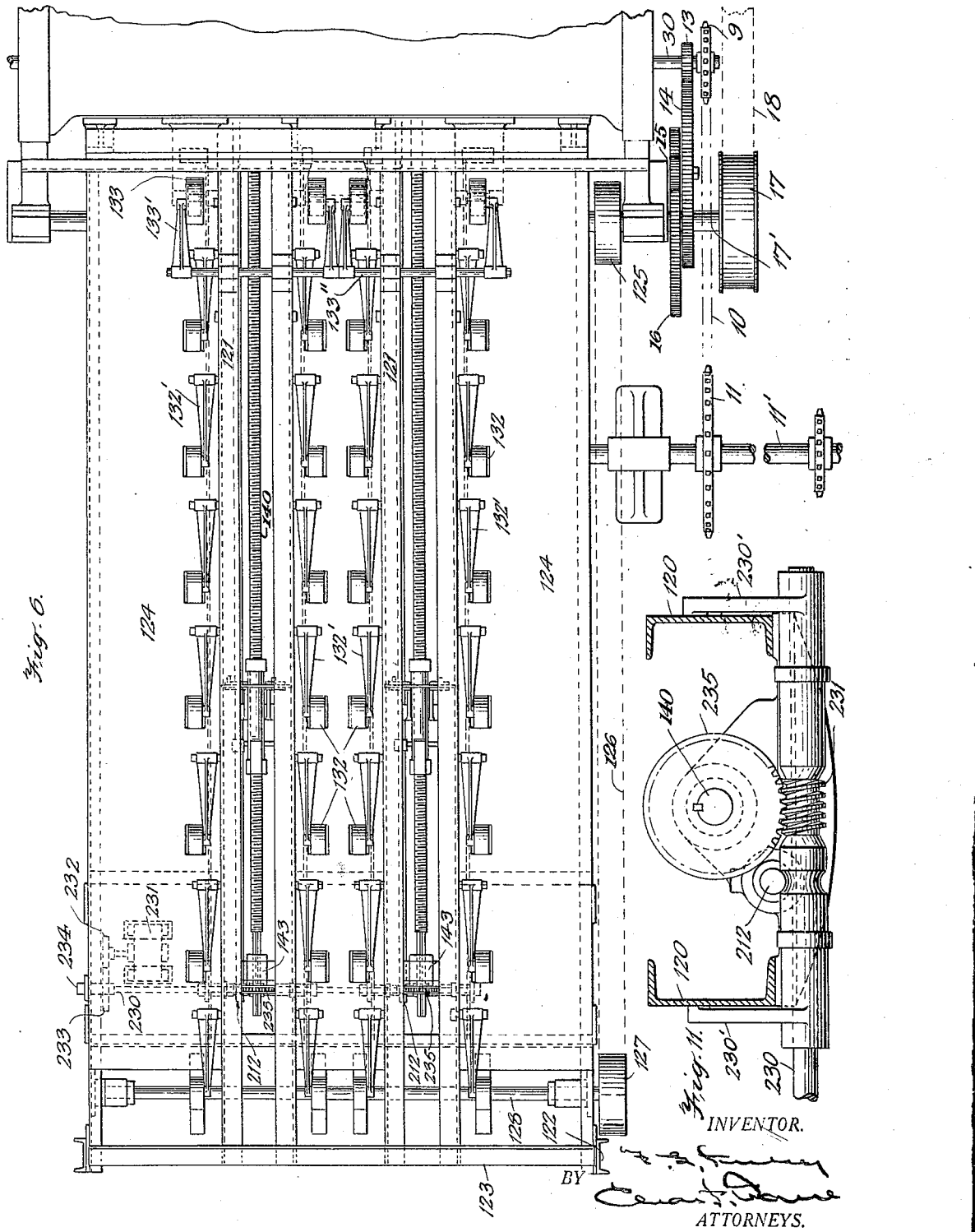

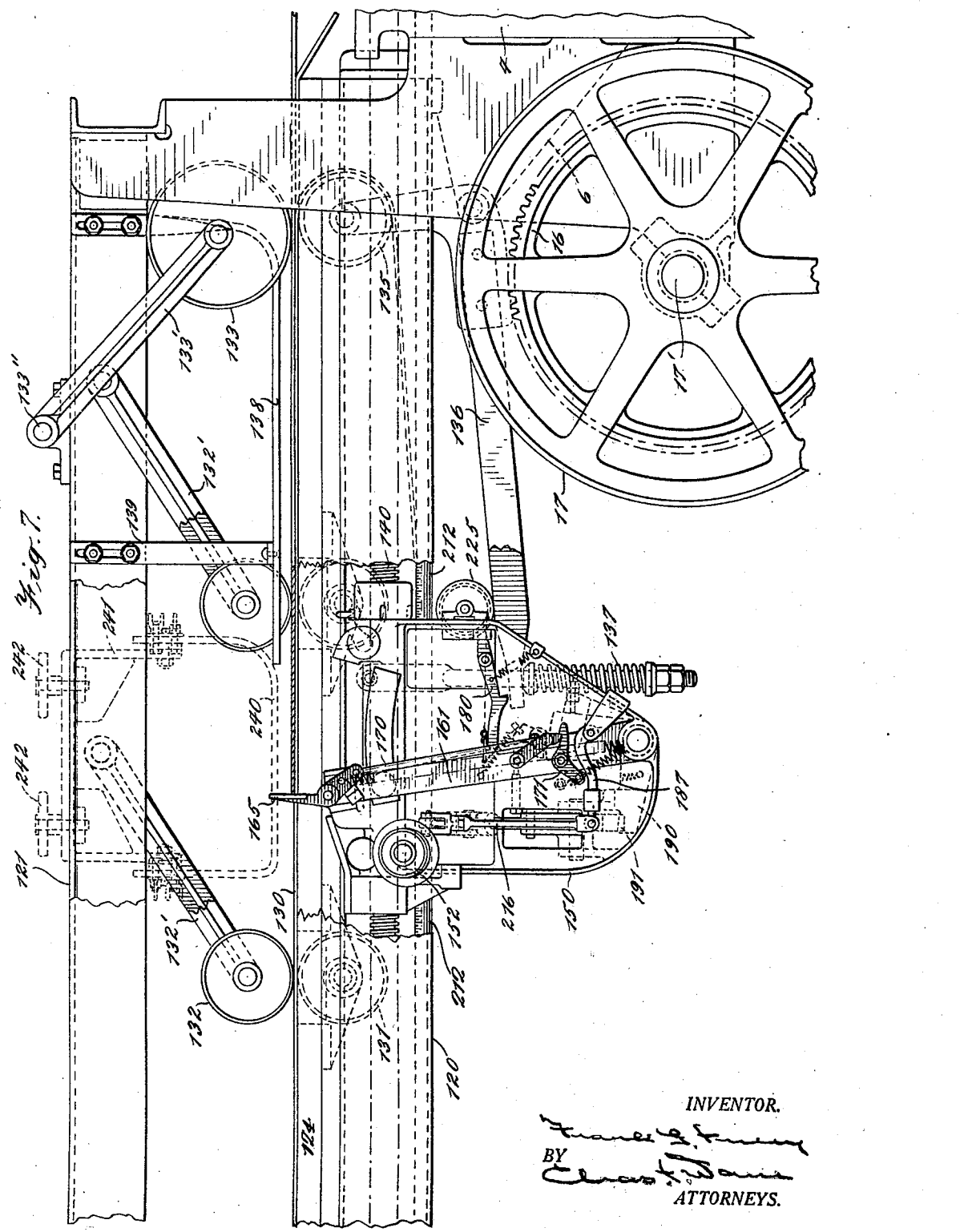

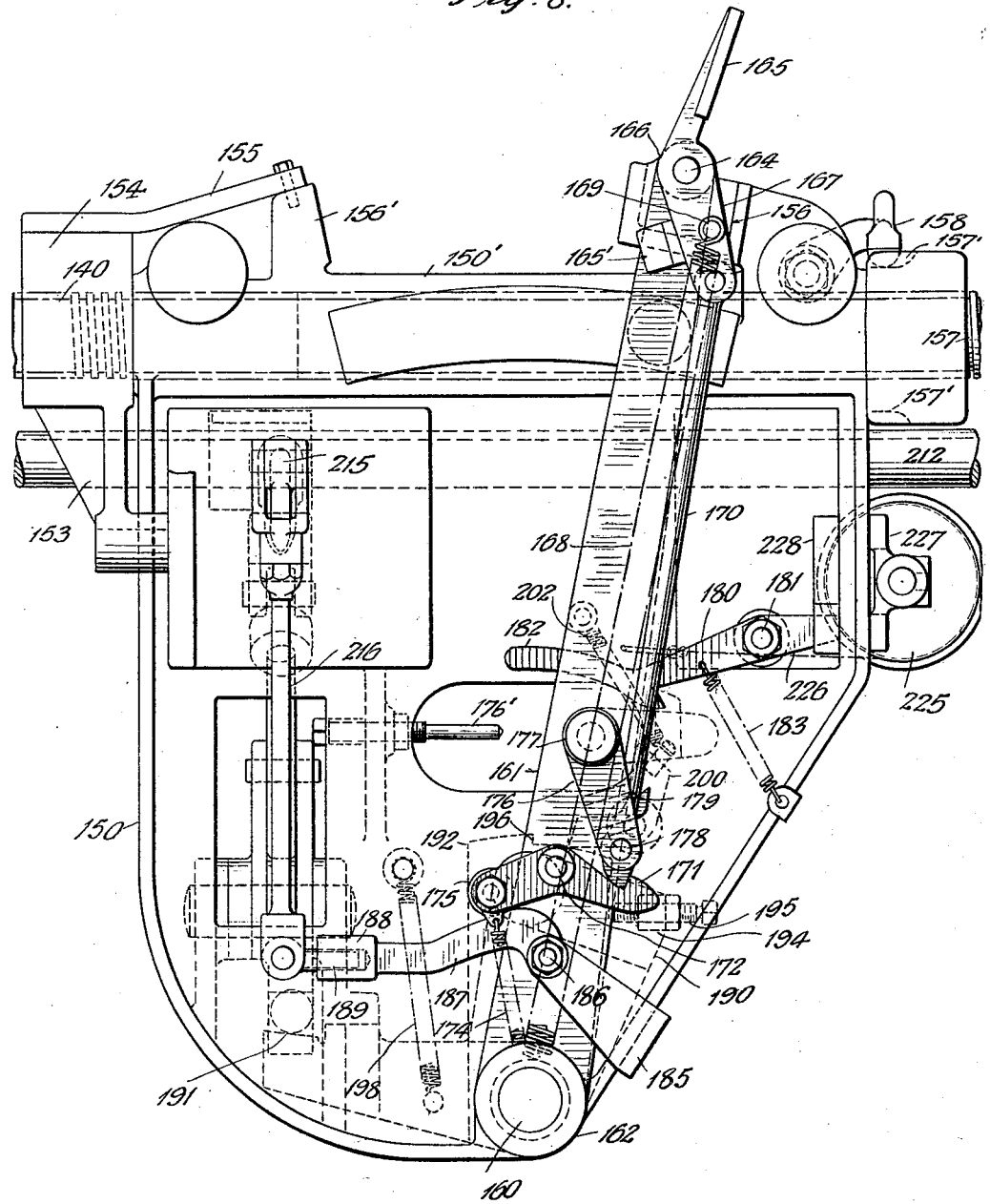

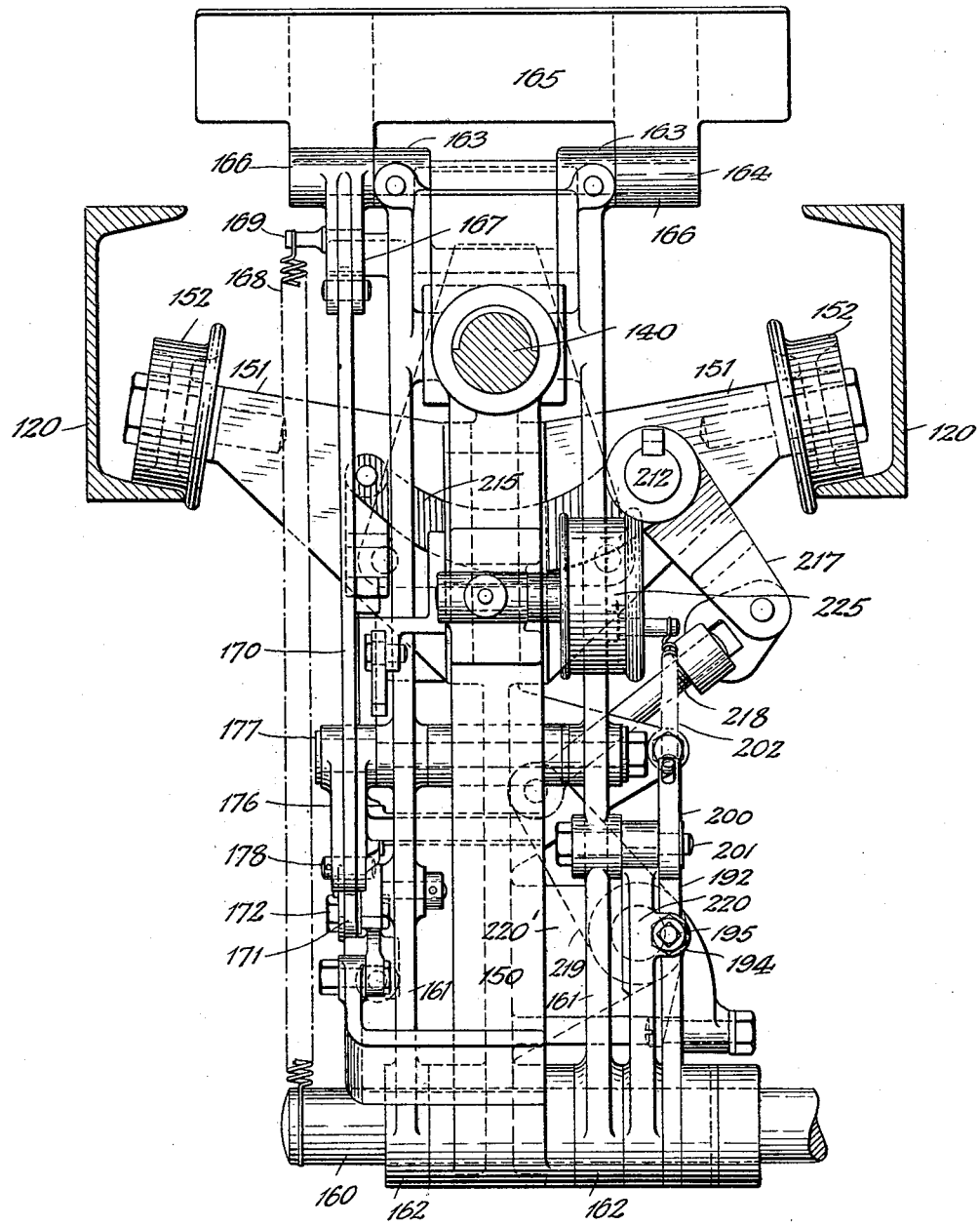

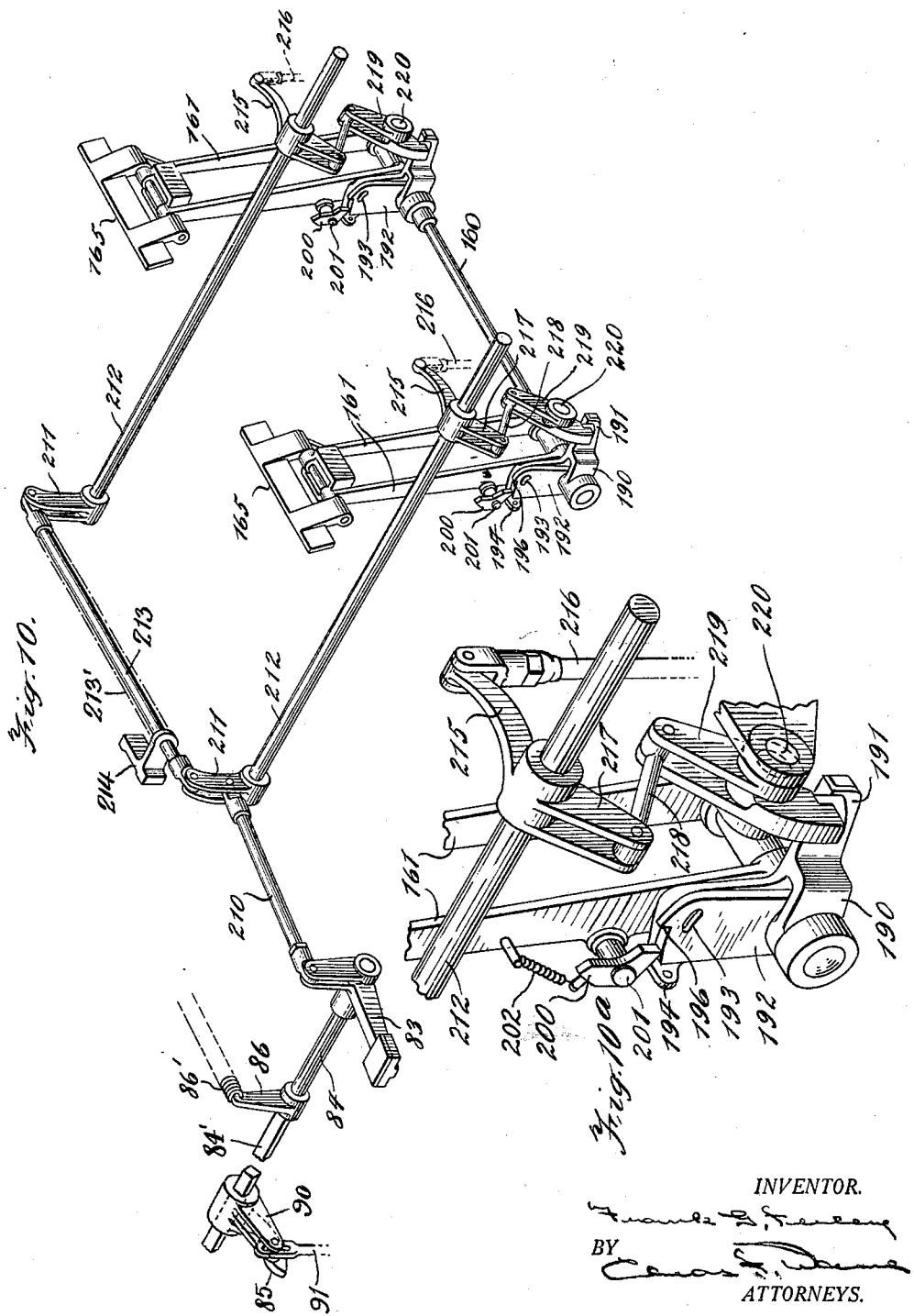

Patented July 12, 1932

1,867,402

UNITED STATES PATENT OFFICE

FRANK G. FEELEY, OF PITTSFIELD, MASSACHUSETTS, ASSIGNOR TO M. D. KNOWLTON COMPANY, OF ROCHESTER, NEW YORK, A CORPORATION OF NEW YORK

SHEARING MECHANISM

Application filed February 24, 1927. Serial No. 170,578.

The invention relates to shear mechanism of the general type disclosed in Patents No. 1,321,039 dated November 4, 1919, and No. 1,321,207 dated November 11, 1919, in which relatively movable shear blades for cuting a web of moving material transversely into sheets are mounted on a carriage that is moved with the web, when the cutting operation takes place, the function of the shear being determined and controlled by the advanced edge of the web engaging a trip device, which latter controls the mechanism for imparting a reciprocatory motion to the carriage and simultaneous relative movement of the shear blades; and the object of the instant invention is to improve machines of this type, so that the operation thereof will result in the production of sheets of uniform length independently of the rate of travel or feed of the web, and thereby avoid the waste due to cutting sheets of varying and irregular lengths, which are produced by the machines of said patents and which, therefore, require further trimming in separate machines, when the lengths of said sheets are too great, or which render the cut sheets inapplicable for their intended use, when the cut lengths are too short.

The invention is illustrated in the accompanying drawings, in which:

Figs. 1 and 1ª are diagrammatic side elevations of the machine showing the general arrangement.

Fig. 4 is an enlarged fragmentary sectional elevation on line 4—4 of Fig. 2.

Fig. 5 is a sectional elevation on line 5—5 of Fig. 2.

Figure 1:
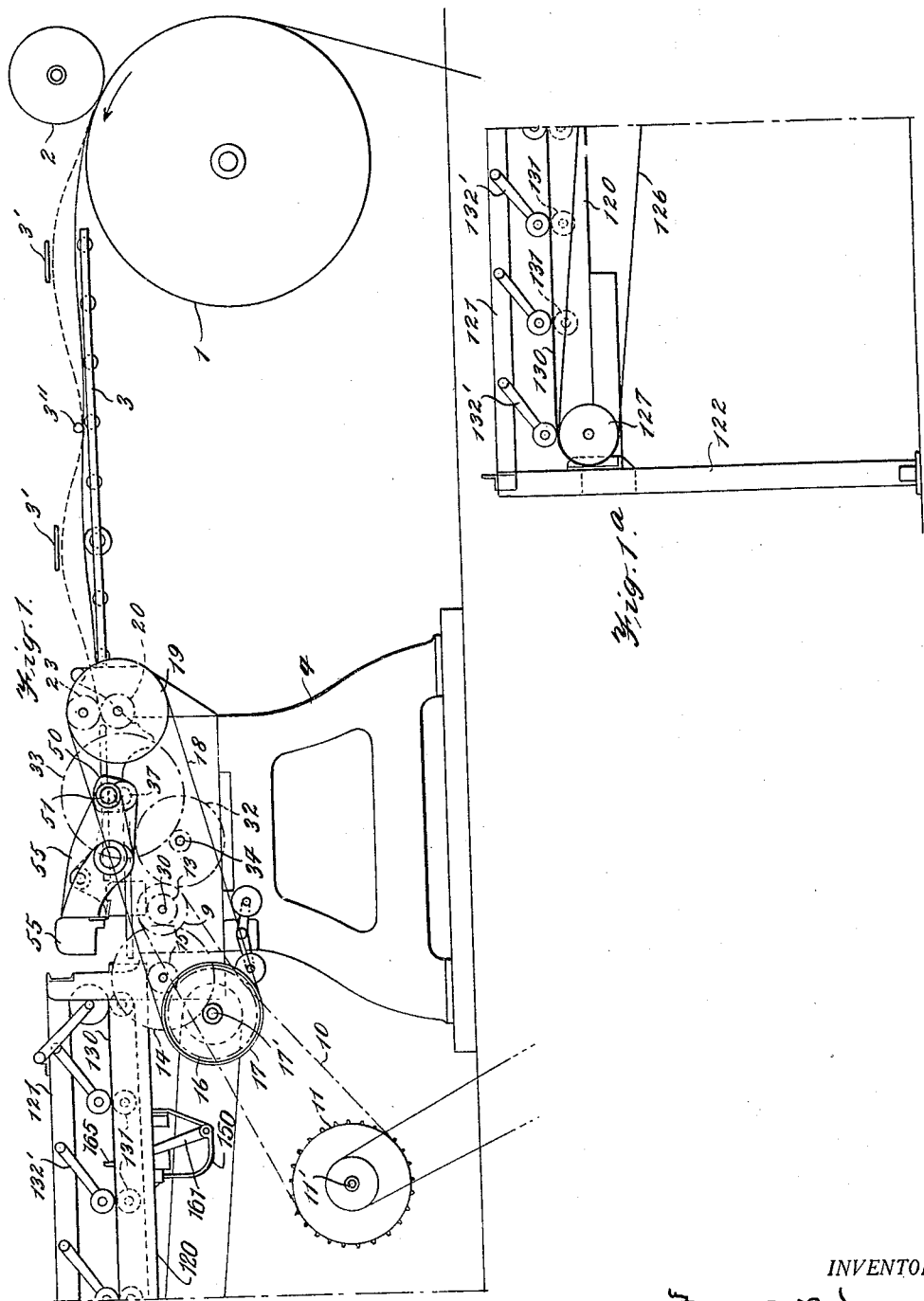

Fig. 5ª is a transverse section through the lower knife bar.

Fig. 6 is a plan view of the rear part of the machine, showing the details of the take-away table.

Fig. 7 is a partial side elevation of the take-away table with certain parts of the mechanism shown in sectional elevation.

Fig. 8 is an enlarged side elevation of the trip mechanism.

Fig. 9 is an end elevation of the trip mechanism with certain of the parts shown in section.

Fig. 10 is a perspective diagrammatic view of the trip mechanism and the elements associated therewith.

Fig. 10ª is an enlarged detail view of the latching mechanism operated by the trip arms.

Fig. 11 is a transverse section through part of the take-away table, showing the means for operating the adjusting screws for the trip mechanism.

Referring to Figs. 1 to 5 of the drawings, 1 indicates a feed drum or roller, with which cooperates a second roller 2, which are so disposed as to feed the continuous web of paper or paper board to be cut to the forwardly projecting feed table 3 of the machine, which latter is preferably provided with the usual web supporting rollers above which are disposed two abutment plates 3', 3', which define the upper limits of the flexures or upwardly deflected sections, which are formed in the web under conditions to be hereinafter described, the double arch effect being produced by a pressure roller 3'' mounted above the table 3 and between the abutments 3', 3'. The feeding and cutting section of the machine comprises a supporting frame 4 provided with a table-like top section 4' over which the web is fed to the knives. The supporting frame includes a cross member 5, preferably in the form of a hollow casting, to which are secured brackets 6, which serve as attachments for the end of the take-away table and certain of the associated elements.

The main drive shaft 11' is provided with a sprocket wheel 11, which is connected by drive chain 10 with a driven sprocket 9 on the end of cross shaft 30 journaled in the upper part of the machine frame 4. Secured to shaft 30 is a gear 13, which drives through reducing gearing 14, 15 and 16, a shaft 17' upon which are mounted belt pulleys 17 and 125, respectively, said belt pulley 17 being engaged by drive belt 18, which operates the lower feed roller 20, mounted on a shaft 21 journaled on the forward end of the machine frame, which shaft carries on its opposite end a gear 22, which meshes with gear 27 on shaft 24 which carries the upper feed roller 23, said shaft 24 being mounted in swinging arms 25 fast to a rock shaft 26 journaled in upstanding brackets on the sides of the machine. This arrangement provides for the simultaneous driving of the feed rollers 20 and 23 and for the elevation of the upper feed roller, under conditions to be hereinafter described.

Mounted on the end of shaft 30 opposite that carrying the sprocket 9 is fixed a gear 31, which meshes with a combined gear and clutch member 32 secured to the face of fly wheel 33, which is loosely mounted on shaft 34 extending transversely of the machine. The member 32 includes an inner frusto-conical clutch member 40 with which co-operates a male clutch member 41 fast to shaft 34, but slidable longitudinally of the shaft under action of the usual type of clutch spring 41', which cooperates with the clutch yoke 44, which, in turn, is actuated by rod 45 connected to the upper end thereof. This constitutes a well known form of clutch mechanism, the parts of which are adapted to be thrown into operative engagement by the spring 41' and to be retracted from such operative relation by means of the pull rod 45. Associated with the male clutch member is a member 42 of a brake, which cooperates with a stationary brake member 43 fast to the machine frame, these brake members being engaged to stop the operation of the machine, when the members of the clutch are disengaged.

Secured to the shaft 34 on the opposite side of the machine is a gear 35, which meshes with gear 36 fast to a cross shaft 37, journaled in bearings on the machine frame, the outboard ends of said shaft 37 being provided with combined cam members 50 and crank pins 51, which, therefore, partake of the rotation of the shaft 37.

Slidably mounted on trackway 61' on the upper part of the machine frame 4 is a carriage comprising side members 61 connected by a hollow cross bar 60, which supports the lower knife 62. The side members 61 are extended upwardly and are connected by a suitable cross brace 64 to supply additional rigidity to the sliding carriage. Secured in openings in the side members 61 are tapered pintles 58, carrying bushings 57, each having a complementary internal taper engaging the pintles, said bushings constituting adjustable bearings for a generally yoke-shaped member 55 having oppositely disposed openings 56 therein, by means of which the yoke is mounted for oscillatory movement on the pintles 58. The forward ends of the yoke are provided with eyes 59, which engage the crank pins 51 on the ends of shaft 37, so that, as said shaft is rotated, a rocking motion is imparted to the yoke member 55. Fixed to the front lower edge of the transverse member of the yoke 55 is an upper knife 63, which, when the yoke is rocked on pintles 58, moves into and out of cooperative engagement with the lower knife 62 and thereby cuts the web of paper board or the like being fed to the machine.

Associated with the upper knife is a combined presser and stripper mechanism, comprising a generally channel-shaped bar 73 slidably mounted on the front face of the knife 63 by means of pin and slot connection 72, the bar 73 having secured thereto rods 70, which slide through straps 71 fixed to the upper face of the yoke 55, each of the rods carrying a helical spring 74 which normally tends to press the bar 73 downward against the stock overlying the lower knife during the cutting operation and also serving to strip the cut stock from the upper knife, when the latter is retracted by the upward swinging movement of the yoke 55.

It will be particularly noted that the double crank connection between the rotary shaft 37 and the yoke 55, which latter is pivoted on the sliding carriage, causes the latter to be reciprocated on the trackway 61', so that both knives move with the sheet to be cut during the cutting operation and move in the opposite direction to the movement of the sheet, after the cutting operation has been effected and the upper knife is withdrawn.

Figure 2:
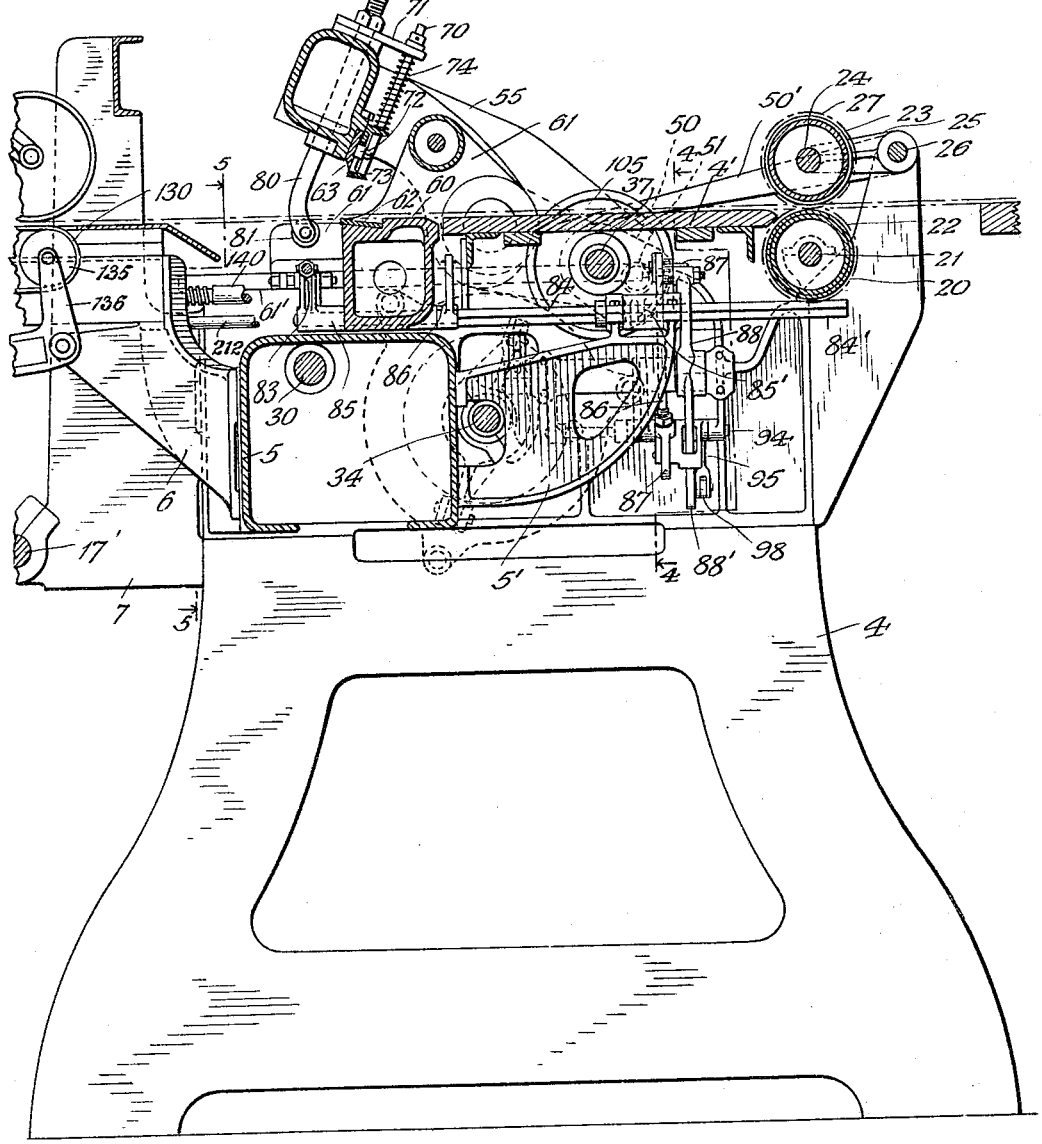
Fig. 2 is a sectional elevation on line 2—2 of Fig. 5.
Figure 3:
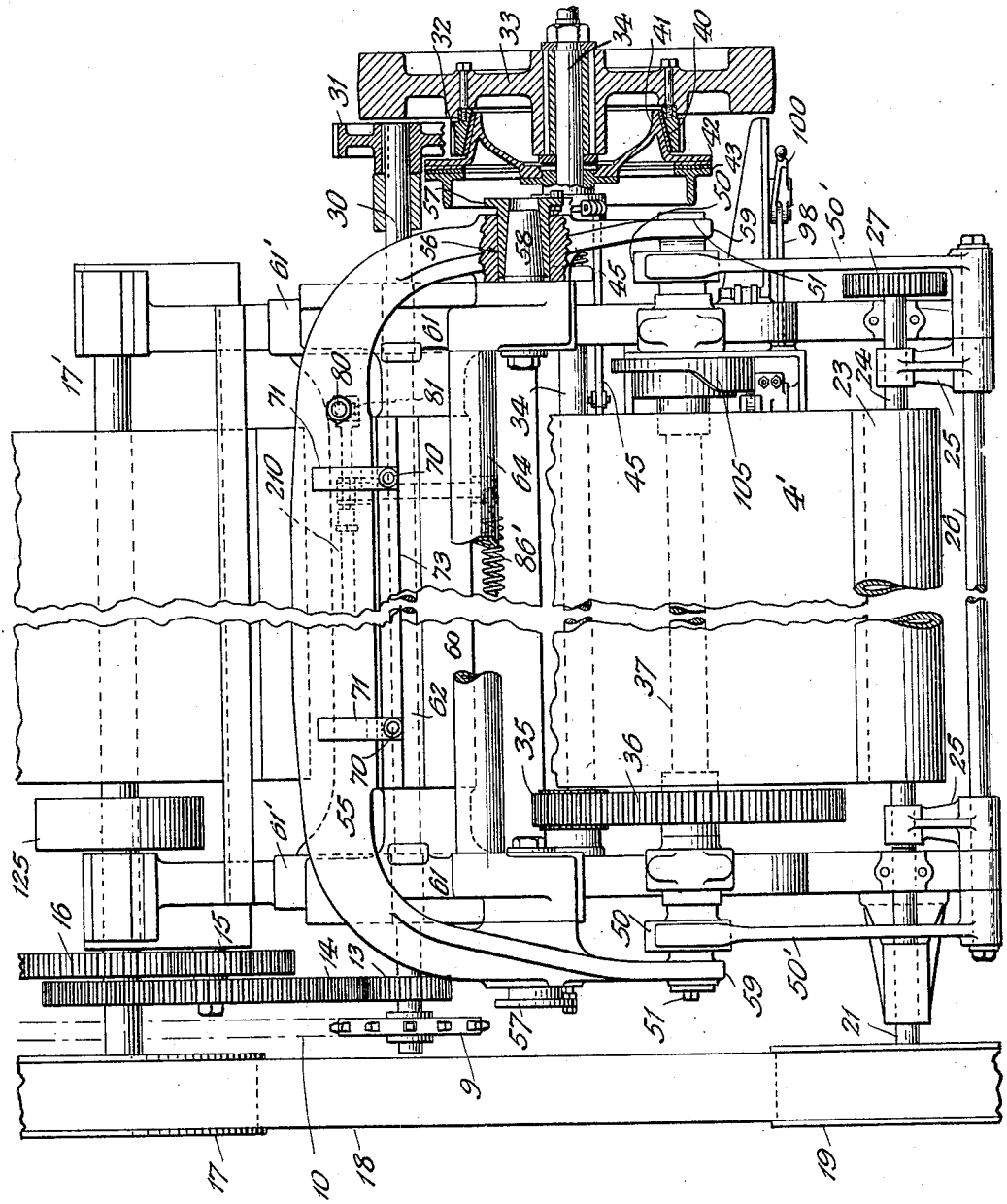
Fig. 3 is a plan view of a portion of the machine shown in Fig. 2, certain of the elements being shown in horizontal section.

Mounted in one side of the transverse member of the yoke 55 and adjacent to one end of the movable knife 63 is an adjustable trip rod 80, which carries a roller 81 on its lower end, which is adapted to engage one end of the bell crank lever 83, which is fast to a shaft 84 journaled in bearings on the cross member 60 of the sliding carriage, the forward portion of the shaft being square, as at 84', so as to permit the shaft to slide with the carriage in a bearing formed on the bracket 5' secured to the cross member 5, as illustrated in Fig. 2. The mounting of the squared portion 84' of the shaft 84 in the bearing on bracket 5' is effected by means of a bushing 85' having a square opening through which the shaft slides, and annular end projections, which engage the journal bearings in the bracket 5', said bushing having formed thereon two substantially parallel arms 85 and 90, as shown more particularly in Fig. 4, the parts being so arranged that, when the shaft 84 is partially rotated, a corresponding rotatory movement of the arms 85 and 90 will be effected. Fast to the shaft 84 is an arm 86, to the end which is attached a helical spring 86', the other end of which is anchored to the cross member 60, the spring 86' serving to return the shaft 84 to its normal position, after it has been partially rotated by the trip rod 80, when the yoke 55 is swung downward in the cutting operation. It will be noted that the hubs of the levers 83 and 86, which are locked to the shaft 84, engage the opposite end of the journal bearings of said shaft in the cross member 60 and serve to prevent longitudinal movement of said shaft with respect to the cross member 60 and the sliding carriage, but insure the movement of the shaft with the carriage in both directions.

Journaled in brackets extending inwardly from the side frame of the machine is a shaft 89 having two squared sections and an intermediate cylindrical section. On one squared section is secured an arm 45′ to which is attached the end of clutch operating rod 45 and on the other squared section is secured an arm 88 carrying on its upper end a pivoted pawl 87, adapted to engage a shoulder on the upper face of an arm 88ª, the lower end of which is loosely mounted on the shaft 89, the upper edge of the arm 88ª carrying a roller 106, which cooperates with a cam 105 fast to shaft 37. Mounted in the same brackets below the shaft 89 is a second shaft 94 to which is secured bell crank 95, one arm of which is provided with a pin 96 engaging a slot in the adjustable end section 87″ of a rod 87, the upper end of which is connected to the pawl 87′, so that, when said bell crank is actuated in one direction, it will lift the rod 87 and disengage the pawl 87′ from the arm 88ª to permit the clutch spring 41′ to move yoke 44 into clutch engaging position, as the shaft 89 is free to rotate by reason of the disengagement of said pawl 87′ from arm 88ª, so that the pawl rides over the top of said arm. Normally, the position of the roller 106 on the arm 88ª is that illustrated in Fig. 4, where the roller occupies a high part of the cam and the arm 88 is locked in the position shown by the pawl 87′ engaging the shoulder on the arm 88ª, whereby said arm 88 serves to hold the male member of the clutch in retracted or disengaged relation.

The manual control of the clutch is effected by means of a handle 100 pivoted to the machine frame, said handle having a crank end, which is connected by pull rod 98 with bell crank 95, the handle being held in the different positions of its adjustment by a spring stop 102 engaging a segment 101. The forward end of the bell crank 95 is provided with a pin or abutment 97, which is adapted to engage an extension 88′ of arm 88, so that, when the handle 100 is moved to down or safety position, the pin 97 holds arm 88 in the position shown in Fig. 4, which will prevent the operative engagement of the clutch members so long as the handle remains in this position. The rock arm 85 on the shaft 84 engages a shoulder on the rod 87, so that, as said arm 85 moves upward, it elevates rod 87 and releases the pawl 87′ from its engagement with the shoulder on arm 88ª. This releasing movement of the arm 85 is effected by the trip mechanism, which is operated by the sheets to be cut, as will be hereinafter explained.

Rigidly secured to the shaft 94 is an arm 93, the forward end of which is connected with an adjustable rod 91, the upper end of which is provided with an elongated slot, which is engaged by a pin on arm 90 fast to squared shaft 84 and imparts a rocking motion to the latter.

The bell crank lever 83, which is fast on shaft 84, is connected by a link 210 to an arm 211 fast to a torsion rod 212, one end of which is rotatably mounted in the rear face of the cross member 60 of the carriage, as more particularly illustrated in Fig. 5ª, the other end of said torsion rod being journaled in a bearing mounted on the take-away table, to be hereinafter explained. A duplicate torsion rod 212 is similarly mounted and connected, and is provided with an arm 211 similar to that shown on the first mentioned torsion rod, said arms 211 being connected by a link 213, which is surrounded by a helical spring 213′ bearing at one end against a collar on the link and at the other end against a fixed bracket 214 secured to the machine frame and through which the link 213 slides, as particularly illustrated in Figs. 5 and 10. The action of this spring 213′ augments that of spring 86′ to rock the torsion rods 212, 212, when the trip mechanism, to be hereinafter explained, releases these torsion rods, and also to rock shaft 84 so that arm 85 thereon engages the abutment on rod 87, lifts said rod and disengages pawl 87′ from arm 88ª, thereby permitting the clutch to be operated, so that shaft 37 is driven through a full rotation, the upper knife carrying yoke 55 is oscillated to impart the cutting and withdrawal stroke of the upper movable knife and the carriage carrying both knives is first moved forward with the web and then retracted to its stationary position.

As shown, the torsion rods extend longitudinally of and beneath the take-away table, which latter comprises a longitudinal series of spaced channel irons 120 and an upper set of similarly spaced angle iron sections 121, which several sections are connected at their ends by cross members 123, the rear end of the table being supported by suitable legs 122. A suitable top 124 comprises spaced plate sections supported on the bottom channels 120, as illustrated in Fig. 6, the top sections being provided with rectangular openings at intervals to permit the belt supporting rollers 131 to project therethrough, said rollers being supported on brackets attached to the under faces of the top sections 124. A series of presser rollers 132 mounted on arms 132′ pivoted to the upper angle members 121 normally engage the upper surfaces of the discharge belts. In the particular exemplification of the machine as illustrated, there are four of these belts 130 driven from pulleys mounted on a transverse shaft 128 at the rear end of the table, which shaft is operated by pulley 127 and belt 126 from pulley 125 fast to shaft 17', each belt at the forward end of the table passing over a pulley 135 mounted upon the pivoted bell crank 136 of a belt tightener, the outer end of which is acted upon by the usual spring tension device 137. Upper presser rollers 133, mounted upon arms 133' connected to a cross shaft 133'', engage the several belts above the pulleys 135 and cooperate with the belts in feeding the web over the take-away table.

In order to maintain the web flat on the take-away table, there are provided plates 138 overlying the forward portion of said table, which are adjustable toward and from the belts 130 by means of straps 139 having slotted ends connected to upper frame members 121 by bolts, as shown in Fig. 7. Additional means for holding the web flat may be provided, in the form of generally U-shaped frames 240 adjustably secured to straps 241, which are secured to the flanges of members 121 by clamps 242, whereby these holding devices may be adjusted longitudinally of the take-away table and vertically with respect to the belts carried thereby.

In the instant machine, there are employed duplicate trip mechanisms associated with the torsion rods 212, each of said trip devices comprising a frame-like casting 150 having lateral brackets 151 attached thereto, upon the ends of which are journaled wheels 152, by means of which the frame 150 is supported for movement longitudinally of the channel members 120 of the take-away table. The upper portion of the frame 150 is provided with a longitudinal opening through which passes a screw shaft 140, by means of which the adjustment of the frame and the trip mechanism carried thereby is effected, whereby the length of the sheets to be cut is accurately determined. Each of the screw shafts 140 is rotatably fixed to the rear face of the lower fixed knife bar 60, in the manner shown in Fig. 5ª, the end of the screw shaft having a threaded engagement with a rotatable collar 141, which is journaled in a bracket 142 bolted to the bar 60. Operative connection between each frame 150 and the corresponding feed screw 140 is effected by means of a nut 154, which is secured, by a bracket extension 153, to the frame, and likewise by a strap 155 bolted at one end to the top of the nut and at the other to a rear stop member 156' formed on the upper face of the frame, the corresponding front stop member 156 being located adjacent the front end of the frame. A lock nut 157 engages the feed screw 140 adjacent the forward side of the frame 150 and is provided with a series of notches 157', with which cooperates a swinging latch 158 pivoted to the upper portion of the frame and which serves to lock the nut 157 both in its clamping relation with respect to the frame 150 and also to cause the nut to travel with the frame in the adjustment of the latter, when the feed screw 140 is operated. This latter operation is effected by backing off the set nut a part turn and engaging one of the notches 157' by the latch 158, which prevents the rotation of the nut and causes the latter to travel with the carriage, when the feed screw 140 is operated.

The lower end of the frame 150 is provided with a bearing in which is mounted a transverse shaft 160, said shaft extending between the two frames 150, in the particular construction of the machine shown, as illustrated in Fig. 10. Mounted on the shaft 160 is a trip lever formed of two spaced arms 161, connected near their tops by a cross piece and having ears 163 to receive the pintle 164 upon which is pivoted a stop plate 165, which is normally held in engagement with a stop lug 165' on one member of the trip arm 161 by means of a tension spring 168 anchored at one end to a pin 169 on a depending arm 167 of the stop plate and at the other end to the shaft 160. Pivotally connected to the arm 167 of the stop plate is a latch rod 170, the lower end of which engages the notched end of a latch 171 pivoted at 172 to one member of the trip arm 161. The lower end of the rod 170 is also connected by pin 178 to a short arm 176, pivoted at 177 to the trip arm 161, said arm 176 carrying latching lug 179, adapted to engage a latch member 180 pivoted at 181 to the frame 150, which latch member is normally held in engagement with a stop on a bracket 228, secured to the frame 150, by means of a tension spring 183, said latch member having an extended curved rear end 182. The latch 171, which is pivoted intermediate its length, is normally held in engagement with the end of rod 170 by means of a tension spring 174, as indicated in Fig. 8, and the end of the latch to which the spring is attached is also provided with a roller 175, which engages the upper edge of a curved lever 187, which is pivoted at 186 to a bracket 185 secured to the frame 150, the rear end of said curved lever 187 being provided with a threaded socket 188, which is engaged by a pin 189, which is connected to the lower clevis end of a rod 216, the upper end of which rod is provided with a clevis which is pinned to the end of a rock lever 215 slidably keyed to the corresponding torsion rod 212, so that, when said torsion rod is rotated in one direction, the lever 215 will lift the rod or link 216, which will swing the curved lever 187 upward and cause the latter to trip the latch 171 out of engagement with the lower end of latch rod 170, which is attached to the stop plate 165. The lever 215 is provided with a lateral clevis extension 217 in which is pinned a link 218, which, in turn, is connected to a latch member 219 pivoted on a pin 220 secured in lugs 220' formed integrally with the frame 150. The pivoted latch 219 cooperates with a notch in arm 191 of a latch plate 190, which is loosely journaled on shaft 160 adjacent one side of the trip arm 161. With this latch plate 190 is associated a second plate 192, which is also loosely mounted on shaft 160 and is adapted to be connected to latch plate 190 by a pin and slot connection 193, the proper relative adjustments of the plates being secured by means of a set screw 195 mounted in a lateral lug 194 on the plate 190 and abutting the rear edge of plate 192. The plate 192 is provided with a shoulder 196 on its upper edge, which is engaged by a pawl 200 pivoted on a stud projecting laterally from the adjacent member of trip arm 161, said pawl being held in engagement with the plate 192 by means of a helical spring 202, the other end of which is connected to the trip arm 161. A pin 176' (Fig. 8) mounted in a lateral bracket on the main frame 150 engages the pawl 200 at the proper time to swing the same out of engagement with the plate 192.

The trip arm 161, which is operated by the advancing edge of the web to be cut is returned to its normal position, as shown in Fig. 8, by means of a spring motor 225, which is mounted on a bracket 227 secured to the frame 150, which bracket is also provided with a stop lug 228, which holds the latch member 180 in proper position to be engaged by the locking pawl 179, when the trip arm is returned to its forward position by the motor 225, the purpose of the latch 180 being to prevent the rebound of the trip arm, when the latter strikes front stop 156. The extended curved end 182 of the latch 180 prevents the pawl 179 passing out of engagement with latch 180 in the swinging movement of the former, as will be understood.

Inasmuch as the trip arms 161 in each of the duplicate trip mechanisms shown in this machine are fixed to the cross shaft 160, it will be apparent that the spring motor 225, which is connected by a chain or strap 226 with one of the trip arms, is effective in returning both trip arms to their normal positions against the front stops 156.

As indicated, the trip mechanism is adapted to be adjusted longitudinally of the take-away table, so that, when said trip arms engage the rear stops 156', the position of the stop plates 165 will determine the length of the sheet to be cut and absolute uniformity in length of the cut sheets will be assured. As indicated, the longitudinal adjustment of the trip mechanism is effected by means of the feed or adjusting screws 140, the forward ends of which are fixed to the lower knife bar 160, as hereinbefore explained, so that the distance between the stop plates and the lower knife, when the trip arms 161 engage the rear stops 156' on the frame 150 of the trip mechanism, will accurately determine the length of the sheets to be cut from the web. Special means are provided for simultaneously operating both of the feed screws 140, said means comprising a cross shaft 230 journaled in brackets 230' secured to the lower channel member 120 of the take-away table near the rear portion of the latter, said shaft being provided with worms 231, which engage worm wheels 235 keyed to the reduced ends of the feed screws 140, so that rotation of the shaft 230 will rotate each of the screws in the same direction and to the same extent, thereby accurately adjusting the trip frames 150, which are rolled along the supporting channels 120, and are subsequently locked in accurately adjusted position by means of the set nuts 157, as hereinbefore explained. The shaft 230 is preferably operated in either direction by a reversible electric motor 231' secured to the take-away table and connected to the shaft by gears 232, 233. In order to effect the adjustment of the trip mechanism manually, the end of shaft 230 is provided with means for engaging a hand crank therewith, as indicated at 234.

The operation of the machine is as follows: The trip devices are adjusted longitudinally of the take-away table by the simultaneous operation of the feed screws 140, the proper adjustment being indicated preferably by scale markings on one or more of the torsion rods 212, which indicate the exact distance between the front edge of the lower knife 62 and the stop plates 165, when the trip arms 161 engage the rear stops 156' on the frames of the trip devices, which distance fixes the length of the sheets to be cut. The continuous web, in the form of box board, corrugated board or other sheet stock, is fed from the source of supply, which may be the machine for forming the web, to the feed drum and roller 1 and 2, thence onto the table 3 and between the feed rollers 20 and 23, thence to the table 4' fixed to the top of the frame 4. The advancing web passes between the upper and lower knives onto the take-away table where it is engaged by the belts 130 and is held in firm flat engagement therewith by means of vertically adjustable plates 138, the trip arms being, at this time, held in engagement with the front stops 156. The advancing movement of the web causes the trip arms 161 to swing on shaft 160 by reason of the locking connection between the stop plates 165 and the corresponding trip arms, which is effected by means of the rod 170, which engages the pivoted latch 171, as hereinbefore explained. During the period of movement of each trip arm between the front stop 156 and the rear stop 156', the pawls 200 carried by the respective trip arms engage the shoulders 196 on the corresponding plates 192, which are adjustably attached to the latch plates 190 pivoted on shaft 160, and the continued rocking movement of the trip arms 161 swings these latch plates 190 until the notched ends 191 thereof are disengaged from the pivoted latches 219, thereby releasing the torsion rods 212, which are immediately given a partial rotation, by the conjoint action of spring 213' and spring 86', which imparts a partial rotation to shaft 84, which causes arm 85 thereon to engage the abutment on rod 87 to lift said rod and to move pawl 87' out of engagement with the shoulder on arm 88$^a$, thereby releasing shaft 89, which has been locked by the engagement of pawl 87' with arm 88$^a$, and permitting the clutch spring 41' to shift clutch member 41 into engagement with the cooperating clutch member on the gear ring 32, which causes shaft 34 to be rotated and through gearing 35 and 36 to impart one full rotation to the shaft 37. The single rotation of the shaft 37 produces the following results: The crank arms 51 on the ends of the shaft 37 initiate the swinging movement of the pivoted yoke 55 carrying the upper knife, so that said knife moves downward toward the lower knife and, inasmuch as said yoke is pivoted to the sliding carriage carrying the lower knife, this carriage is also advanced. When the forward end of the yoke has been swung downward a sufficient distance to cause the upper knife to engage the surface of the web, the forward edge of the web has forced the stop arms 161 into engagement with the rear stops 156' on the frames of the trip mechanisms, so that the length of the sheet between the stop plates and the knives is accurately determined and is always the same for a given adjustment of the machine. At this time also the presser 73 engages the web and clamps the same against the top surface of the lower knife and stops the feed of the web relatively to the knives and concurrently the high portions of the cams 50 on the shaft 37 lift the arms 50', which are fast to rock shaft 26, and partial rotation of said rock shaft lifts the upper feed roller 23, so as to free the latter from the web and permit the portion of the web occupying the table 3, in advance of the presser 73, to arch upwardly or form temporary flexures limited by the abutment plates 3', 3' and the intermediate pressure roller 3'', as indicated in Fig. 1, thereby taking care of the surplus stock of the web during the cutting operation and without interrupting the uniform feed of the web. As the upper knife completes its cutting stroke, the presser bar 80 carried by the swinging yoke 55 engages the wear plate on the end of bell crank lever 83, forces the end downward, rocks the squared shaft 84, and imparts a partial rotation to the torsion rods 212 in the opposite direction, thereby swinging the levers 215, so that each of the latter rocks the corresponding latch 219 on its pivot and through rod 216 lifts the cam lever 187, which trips latch 171 and releases locking rod 170, thereby permitting the stop plate 165 to be swung backward to substantially horizontal position by the sheet, which then passes over the trip plate. Each of the trip arms is then returned to initial position by the spring motor 225, and, as soon as the cut sheet has cleared the stop plates, the latter are restored to their normal upright positions by the tension springs 168. During the return movement of each stop arm 161 and while the trip plate remains in horizontal position, the latch 176 engages the curved arm 182 of latch 180 and, when each trip arm reaches the front stop, the dog 179 on said latch engages the hooked portion of latch 180 and prevents any rebound of the trip arm. The return movement of each of the trip arms 161 also permits the return of latch plate 190 to normal position, so that the notch 191 in the end thereof is ready for engagement with the latch 219 as soon as the presser rod 80 is disengaged from rock lever 83, when the swinging frame 55 starts its upward movement, and permits the springs 213' and 86' to rotate the torsion rods 212 in the opposite direction, so that the latch plates 190 are again locked in position by the latches 219 engaging the notched ends 191 of said plates and the parts are set ready for the next cutting operation. This rotation of each of the torsion rods 212 causes the corresponding rock levers 215, through rods 216, to depress levers 187, thereby permitting the springs 174 to restore the locking latches 171 to position to be engaged by the lower ends of rods 170 connected to the corresponding stop plates 165, so that, when the sheet has cleared the stop plates and the latter have moved to upright position, they are locked in such position by the engagement of the latches 171. the downward movement of each rod 170 first releasing the pawl 179 on arm 176 from engagement with the latch 180. The stop mechanism is thus restored to operative position to be engaged by the following edge of the web. In order to clear the cut sheet from engagement with the stop mechanism, it is preferable to drive the belts on the take-away table at a somewhat higher speed than that of the normal travel of the web through the cutting mechanism due to the action of the feed rollers, thereby leaving an appreciable space between the rear edge of the cut sheet and the forward edge of the following web.

Referring to Fig. 4, it will be noted that the roller on the arm 88$^a$ is in engagement with the high section of the cam 105 on shaft 37; the immediate effect of this is to apply the braking face 42 on the rear of the clutch member 41 to the stationary braking member 43. This braking action is applied gradually after each cutting operation by the inclined surface of the cam, which swings the arm 88ª to the left, as shown in Fig. 4, thereby withdrawing the male clutch member 41 from engagement with the cooperating clutch member on the gear ring 32 and engaging the brake members as aforesaid. During the continued rotation of the cam, the roller 106 on arm 88ª rides down the incline of the cam and said lever is swung to the right by the action of spring 88″, so that the upper face of said arm 88ª is in position to re-engage the pawl 87′; when the arm 88ª is rocked to the left as the roller 106 rides up the incline of the cam, the engagement of the pawl 87′ with the shoulder on plate 88ª, rocking lever 88 to left, withdrawing the clutch and applying the brake.

Just before the upper knife 63 engages the web, the combined presser and stripper bar 73 comes in contact with the web, forces the same into engagement with the lower knife 62 and remains in this clamping position during the cutting operation. Immediately the upward movement of the yoke 55 begins, the springs on the rods carrying the stripper bar force the latter downward, which clears the web from the upper knife.

As hereinbefore explained, the upper feed roller 23 is elevated to stop the feeding of the web at or about the time the upper knife engages the web and the latter is clamped to the frame carrying the knives by the presser 73. As the result of this, the portion of the web in front of the feed rollers is caused to flex or loop, as shown in Fig. 1. Shortly after the cutting operation has been effected and the upper knife carrying yoke begins its upward travel and the stripper bar has cleared the forward edge of the web from the upper knife, the spring action of these flexed portions of the web forces the latter out flat on the table, immediately after which the lifting rods 50′ pass onto the lower portions of the cams 50, the upper feed roller 23 is dropped into engagement with the lower feed roller 20 and the normal feeding operation is resumed.

While this particular machine is constructed and arranged to form two flexures or loops in the web to take care of the surplus stock during the cutting operation, it is obvious that, under certain circumstances, the machine may be adapted to form a single flexure in the same general relation. This flexing action is initiated by forming a portion of the top of the table 3 at a higher elevation than the general surface level thereof, as, for example, by making one of the rollers larger than the others, and the purpose of the abutments or baffle plates 3′ is to limit the height of the flexure to prevent the web buckling to such an extent as to get out of control and fail to return to the normal flat position necessary to the correct feeding of the web to the cutter.

As described, the machine is provided with a controlling handle 100, which is adjustable to three positions, that illustrated in Fig. 4 of the drawings being the normal or running position, when the handle engages the intermediate notch in the sector 101. When the handle is moved to upright position to engage the stop on the upper part of the sector, the machine runs continuously, as the pawl 87′ is lifted out of engagement with arm 88ª by the engagement of pin 96 on bell crank lever 95, with the upper part of the slot in rod 87 and lifts said rod and with it pawl 87′, so that the members of the clutch remain in engagement and the cutting mechanism is operated continuously. The principal advantage of this mode of control is to enable the stock to be cut up into relatively short lengths or to excise damaged or imperfect sections of the web. In the third or safety position, the handle 100 is moved until the stop pin 102 engages the lowest notch on the sector 101, this movement of the handle 100 rocks bell crank 95 and the shaft 94, to which the same is rigidly secured. The rocking movement of the bell crank 95 causes the abutment or pin 97 on the end thereof to engage the pendant end 88′ of arm 88, thereby locking the shaft 89 against rotation and holding the male clutch member out of engagement with the cooperating clutch member. The partial rotation of shaft 94 by the bell crank 95 moves rod 91 downward until the upper part of the slot on the upper end thereof engages the pin on arm 90, fixed to squared shaft 84, imparting a slight rotatory movement to said shaft in a direction to rotate the torsion rods to free the latches 219 from the latch plates 190 and to lift levers 187 by means of rods 216, thereby releasing the latch rods 170 of the stop plates 165, so that the latter are free to drop over backward and permit the sheet of stock to pass freely over the take-away table in a continuous length, as the operation of the cutters has been suspended by the locking out of the movable clutch member.

While the machine has been illustrated as involving duplicate stop mechanisms, it will be obvious that it may include one, two or more of such stop mechanisms, depending upon the width of the web operated upon. Obviously, when the machine is equipped with a single stop mechanism the latter, with its accessories, will be located as near as feasible in the longitudinal center line of the machine to prevent any deviation of the sheets from a straight line of feed through the machine.

As hereinbefore indicated, the machines illustrated in the prior patents referred to involve the operation of the machine at such speed that the horizontal motion of the cutting blades, or the carriage carrying the same, was the same as the speed of the web which is being cut, during the cutting operation, the forward travel of the web thus being undisturbed. In such machines, the accuracy of the length of the sheets cut depended upon all of the elements of the mechanism functioning identically and uniformly during each cutting operation. Because of the inevitable variation in the speed of the travel of the web through the machine, it is obviously impossible to realize the ideal conditions stated, so that variations in the lengths of the cut sheets cannot be avoided, so that the product of the machine consisting of sheets of varying lengths must be retrimmed or must be discarded for the particular purpose for which they are intended, either event resulting in the waste of material and time. The machine constituting the present invention avoids these difficulties and insures practical uniformity of the length of the sheets cut, the cutting operation being effected when and only when the exact length of the sheet has been determined by the stop mechanism, which latter is susceptible of most accurate adjustment and is, in all respects, positive in its control of the length of the sheet, fixing the length of the web between the cutting blades and the stop mechanism at the instant the upper blade of the shear engages the web, irrespective of any variation in the speed of the web through the machine. As a matter of fact, in practical operation, the machine is so timed that the forward movement of the shear carriage during the cutting operation is somewhat slower than the speed of the web being cut. In other words, the distance between the front face of the stop plate 165 and the rear face of the knife carriage is definitely fixed and determined by the position of adjustment of the stop mechanism on the feed screw 140, which latter is positively connected to the shear carriage, so that the length of the web to be cut is accurately determined by this relative adjustment of the stop mechanism and the shear carriage and fixes the length of the sheet which is invariable, irrespective of any variation in the speed of feed of the web to the shear, the excess stock of the web, due to the high speed of the latter, being taken care of by the formation of the humps on the forward feed table immediately after the upper knife has engaged the web. In practice, the speed of the shear is slower relative to that of the web only a slight amount, so that the hump or humps formed is or are relatively small. In fact, it is only necessary to reduce the speed of the shear carriage below that of the web an amount sufficient to make certain that the stop plate 165 shall have reached the limit of its forward swing and slightly arrested the movement of the web before the upper blades descend far enough to enter the web to cut off the sheet.

The outstanding characteristics of the new machine, therefore, are, first, the absolute precision of operation insuring the cutting of sheets of uniform length, whether the machine is being operated at a constant speed, from a standing start to any running speed, or from any running speed down to an absolute stop, which is effected automatically without requiring adjustment or regulation by an attendant or operator; second, the facility with which the stop mechanisms are accurately adjusted and maintenance of such adjustment against accidental derangement; and third, the adaptability of the machine to the cutting of sheets of various types, forms and characters, including variations in width.

With a machine of the character described, the accuracy in the length of the sheets cut is such that cross grain sheets are cut to finished size at once, the edge being cut with a guillotine type shear is square, consequently the sheets may be applied to their intended commercial uses, such as formation into creased or slotted containers, without any retrimming whatever. In addition to the saving in the board or stock, due to retrimming which is incidental to the older types of machines, a material saving is effected, due to fewer handlings of the cut sheets and less labor cost. Because of the fact that the travel of the web is arrested during the cutting of each sheet, it is feasible to run the shear relatively slower than it would be possible to run it otherwise. This becomes an important factor, as the speed of the feed of the web to the machine increases, as, for example, when the paster, or forming machine is speeded up. For example, if the feed of the web to the shear is at the rate of two hundred feet per minute, the speed of the shear carriage will be at the rate of from one hundred and forty to one hundred and twenty feet per minute. Only when the length of the cut sheets is decreased to less than fifty inches does it become necessary to speed up the shear to one hundred and fifty or one hundred and sixty feet per minute or higher, as the length of the sheet decreases toward the minimum of twenty inches. Usually, when the sheets are cut to a length above fifty inches, the shears are operated as above described. When the cut sheets are under fifty inches in length, the clutch is locked in and the shears run continuously, but at a speed which will just take the web at the rate the latter is delivered. The positive stop arrests the web and accurately determines the length of the sheets cut. This mode of operation is particularly effective in cutting relatively short sheets at high speeds. For example, when running at two hundred feet per minute in cutting twenty-six inch sheets, if the machine were operating under the trip and clutch mechanism, these devices would have to function ninety-two times per minute. This is obviated by throwing out the clutch and permitting the machine to run continuously.

What I claim is:

1. The combination with shearing means comprising relatively moving blades for transversely cutting a flat web of moving material, of positively actuated means controlled by the aforesaid web of material for bodily reciprocating said shearing means, said actuated means including a stop and trip device connected to and movable with the shearing means to accurately regulate the length of the web material between the stop and shearing means.

2. The combination with shearing means comprising relatively moving blades for transversely cutting a flat web of moving material, of positively actuated means controlled by the aforesaid web of material for bodily reciprocating said shearing means, said actuated means including a stop and trip device connected to and movable with the shearing means to accurately regulate the length of the web material between the stop and shearing means, said trip and stop device being adjustable toward and from the shearing means.

3. The combination with shearing means for transversely cutting a web of moving material, of positively actuated means controlled by the aforesaid web of material for bodily reciprocating the shearing means, the movement of said shearing means in one direction being with the moving web and at a rate less than the rate at which the web is fed, said actuated means including a stop and trip device connected to and movable with the shearing means to accurately regulate the length of the web material between the stop and shearing means.

4. The combination of two cooperating knife blades mounted on a carrier for shearing a flat web of moving material, of positively actuated means controlled by said web of material for operating one of said blades and bodily reciprocating said carrier and blades, said means including a stop and trip device connected to and movable with the knife carrier to accurately regulate the length of the web material between the stop and said carrier.

5. Shear mechanism for cutting a web of moving material comprising a frame slidable in a direction parallel to the direction of movement of the web, relatively movable cutting blades mounted on said frame, a crank shaft, connections whereby the rotation of said crank shaft reciprocates said frame and moves the cutting blades relatively to each other to cut the web, and means controlled by the web for controlling the operation of the crank shaft, said means including a stop and trip device connected to and movable with said frame to accurately regulate the length of the web between the stop and frame.

6. Shear mechanism for cutting a web of moving material comprising a frame slidable in a direction parallel to the direction of movement of the web, relatively movable cutting blades mounted on said frame, a crank shaft, connections between said crank shaft and frame for reciprocating the frame and moving the cutting blades relatively to each other, and positively actuated means for controlling the operation of said crank shaft, said means including a clutch, a combined stop and trip device controlling the operative engagement of the clutch and a positive connection between the combined stop and trip device and the frame to accurately regulate the length of the web between said stop device and the frame.

7. Shear mechanism for cutting a web of moving material comprising a frame slidable in a direction parallel to the direction of movement of the web, relatively movable cutting blades mounted on said frame, a crank shaft, connections between said crank shaft and frame for reciprocating the frame and moving the cutting blades relatively to each other, positively actuated means for controlling the operation of said crank shaft, said means including a clutch, a combined stop and trip device controlling the operative engagement of the clutch and a positive and adjustable connection between the combined stop and trip device and the frame to accurately regulate the length of the web between said stop device and the frame, and means connected with one of the cutting blades for resetting the trip device and locking the clutch in inoperative position upon completion of the cutting operation.

8. Shear mechanism for cutting a web of moving material comprising a frame slidable in a direction parallel to the movement of the material, a cutter stationary with the frame, a cutter frame pivoted to the slidable frame, a cutter carried by the cutter frame at one side of its pivotal axis, the ends of said frame extending to the opposite side of the pivotal axis, a crank shaft connected to said extended ends, means for controlling the operation of said crank shaft, said means including a stop device connected to and movable with the slidable frame to accurately regulate the length of the web material between the stop and the frame.

9. Shear mechanism for cutting a web of moving material comprising a frame slidable in a direction parallel to the movement of the material, a cutter stationary with the frame, a cutter frame pivoted to the slidable frame, a cutter carried by the cutter frame at one side of its pivotal axis, the ends of said frame extending to the opposite side of the pivotal axis, a crank shaft connected to said extended ends, a clutch for operatively connecting said crank shaft, and means controlling the operative engagement of the clutch including a combined stop and trip device connected to and movable with the frame to accurately regulate the length of the web material between the stop and the frame.

10. Shear mechanism for cutting a web of moving material comprising a frame slidable in a direction parallel to the movement of the material, a cutter stationary with the frame, a cutter frame pivoted to the slidable frame, a cutter carried by the cutter frame at one side of its pivotal axis, the ends of said frame extending to the opposite side of the pivotal axis, a crank shaft adjustably connected to said extended ends, a clutch for operatively connecting said crank shaft, and means controlling the operative engagement of the clutch including a combined stop and trip device connected to and movable with the frame to accurately regulate the length of the web material between the stop and frame.

11. Shear mechanism for cutting a web of moving material comprising a frame slidable in a direction parallel to the movement of the material, a cutter stationary with the frame, a cutter frame pivoted to the slidable frame, a cutter carried by the cutter frame at one side of its pivotal axis, the ends of said frame extending to the opposite side of the pivotal axis, a crank shaft adjustably connected to said extended ends, a clutch for operatively connecting said crank shaft, means controlling the operative engagement of the clutch including a combined stop and trip device connected to and movable with the frame to accurately regulate the length of the web material between the stop and frame, and means connected to the pivoted cutter frame for resetting the trip device upon completion of the cutting operation.

12. Shear mechanism for cutting a web of moving material comprising a frame slidable in a direction parallel to the movement of the material, a cutter stationary with the frame, a cutter frame pivoted to the slidable frame, a cutter carried by the cutter frame at one side of its pivotal axis, the ends of said frame extending to the opposite side of the pivotal axis, a crank shaft connected to said extended ends, a clutch imparting a single rotation to the crank shaft, latch mechanism for holding the clutch in inoperative relation, means controlling said latch mechanism to release the clutch, said means including a combined stop and trip device connected to and movable with the frame to accurately regulate the length of the web between the stop and the frame, a spring actuated torsion rod normally held inoperative by said trip device, a lever operated by the torsion rod for actuating the clutch releasing latch, and means connected to the pivoted cutter frame to engage the lever to reset the torsion rod and trip device upon the completion of a cutting operation.

13. A machine for transversely cutting a flat web of moving material comprising relatively moving blades, means for advancing the shearing means with the web during the cutting operation, and stop means positively connected with the shearing means for uniformly regulating the length of the sections to be cut.

14. A machine for transversely cutting a flat web of moving material comprising relatively moving blades, means for advancing the shearing means with the web during the cutting operation, and stop means positively and adjustably connected with the shearing means for uniformly regulating the length of the sections to be cut.

15. A machine for transversely cutting a web of flat material comprising means for continuously feeding the web, shearing means including relatively movable cutters, and stop means positively connected with the shearing means for actuating the latter when a predetermined length of web has passed between the cutters.

16. A machine for transversely cutting a web of flat material comprising means for continuously feeding the web, shearing means including relatively movable cutters, and stop means positively connected with the shearing means for actuating the latter when a predetermined length of web has passed between the cutters, the shearing means moving with the web at a rate less than that of the feed during the cutting operation.

17. A machine for transversely cutting a web of flat material comprising means for continuously feeding the web, shearing means including relatively movable cutters, means for actuating the shearing means when a predetermined length of web has passed between the cutters and for advancing the cutters with the web at a reduced rate of speed relative to the rate of feed of the web, and means for flexing the web in advance of the cutters during the cutting operation.

18. A machine for transversely cutting a flat web of moving material, comprising shearing means including relatively moving blades, means for advancing the shearing means with the web during the cutting operation, means positively connected to the shearing means for uniformly regulating the length of the sections to be cut, and means in advance of the shearing means for imparting a preliminary flexure to the web.

19. A machine for transversely cutting a flat web of moving material, comprising shearing means including relatively moving blades, means for advancing the shearing means with the web during the cutting operation, means positively and adjustably connected with the shearing means for uniformly regulating the length of the sections to be cut, and means in advance of the shearing means for imparting a preliminary flexure to the web.

20. A machine for transversely cutting a web of flat material, comprising means for continuously feeding the web and including means for imparting a preliminary flexure to the web, shearing means including relatively movable cutters, and means positively connected with the shearing means for actuating the latter when a predetermined length of web has passed between the cutters.

21. A machine for transversely cutting a web of flat material, comprising means for continuously feeding the web and including means for imparting a preliminary flexure to the web, shearing means including relatively movable cutters, and means positively connected with the shearing means for actuating the latter when a predetermined length of web has passed between the cutters, the shearing means moving with the web at a rate less than that of the feed during the cutting operation.

22. A machine for transversely cutting a web of flat material, comprising means for feeding the web, shearing means including relatively movable cutters, means for actuating the shearing means when a predetermined length of web has passed between the cutters and for advancing the cutters with the web at a reduced rate of speed relatively to the rate of feed of the web, and means associated with the feeding means for imparting a preliminary flexure to the web.

23. A machine for transversely cutting a web of flat material, comprising means for feeding the web, shearing means including relatively movable cutters, means for actuating the shearing means when a predetermined length of web has passed between the cutters and for advancing the cutters with the web at a reduced rate of speed relatively to the rate of feed of the web, and an abutment associated with the feeding means for imparting a preliminary flexure to the web.

24. The combination with shearing means for transversely cutting a web of moving material, of positively actuated means controlled by the aforesaid web of material for bodily reciprocating the shearing means, the movement of said shearing means in one direction being with the moving web and at a rate less than the rate at which the web is fed, said actuated means including a stop and trip device connected to and movable with the shearing means to accurately regulate the length of the web material between the stop and shearing means, and means in advance of the shearing means for imparting a preliminary flexure to the web.

25. The combination of two cooperating knife blades mounted on a carrier for shearing a flat web of moving material, of positively actuated means controlled by said web of material for operating one of said blades and bodily reciprocating said carrier, said means including a stop and trip device connected to and movable with the knife carrier to accurately regulate the length of the web material between the stop and said carrier, and means in advance of the shearing means for imparting a preliminary flexure to the web.

26. The combination with two relatively movable cutting blades mounted on a carrier adapted to cut a flat web of moving material, of positively actuated means controlled by the aforesaid web of material for imparting reciprocating movement to said carrier in a direction parallel to the direction of movement of the web, said means including a stop and trip device adjustably connected to and movable with the blade carrier to accurately regulate the length of the web material between the stop and the blade carrier, and means in advance of the shearing means for imparting a preliminary flexure to the web.

27. Shear mechanism for cutting a flat web of moving material, comprising a frame slidable in a direction parallel to the direction of movement of the web, relatively movable cutting blades mounted on said frame, positively actuated means controlled by the aforesaid web of material for moving said cutting blades relatively to each other and for reciprocating said frame to and from operative position, said means including a stop and trip device connected to and movable with said frame to accurately regulate the length of the web material between the stop and the frame, and means in advance of the shearing means for imparting a preliminary flexure to the web.

28. Shear mechanism for cutting a web of moving material, comprising a frame slidable in a direction parallel to the direction of movement of the web, relatively movable cutting blades mounted on said frame, a crank shaft, connections whereby the rotation of said crank shaft reciprocates said frame and moves the cutting blades relatively to each other to cut the web, means controlled by the web for controlling the operation of the crank shaft, said means including a stop and trip device connected to and movable with said frame to accurately regulate the length of the web between the stop and frame, and means in advance of the shearing means for imparting a preliminary flexure to the web.

29. Shear mechanism for cutting a web of moving material, comprising a frame slidable in a direction parallel to the direction of movement of the web, relatively movable cutting blades mounted on said frame, a crank shaft, connections between said crank shaft and frame for reciprocating the frame and moving the cutting blades relatively to each other, positively actuated means for controlling the operation of said crank shaft, said means including a stop and trip device adjustably connected to and movable with said frame to accurately regulate the length of the web between said stop device and the frame, and means in advance of the shearing means for imparting a preliminary flexure to the web.

30. Shear mechanism for cutting a web of moving material, comprising a frame slidable in a direction parallel to the direction of movement of the web, relatively movable cutting blades mounted on said frame, a crank shaft, connections between said crank shaft and frame for reciprocating the frame and moving the cutting blades relatively to each other, positively actuated means for controlling the operation of said crank shaft, said means including a clutch, a combined stop and trip device controlling the operative engagement of the clutch and a positive connection between the combined stop and trip device and the frame to accurately regulate the length of the web between said stop device and the frame, and means in advance of the shearing means for imparting a preliminary flexure to the web.

31. Shear mechanism for cutting a flat web of moving material, comprising a feed table having means for imparting a preliminary flexure to said web, a frame slidable in a direction parallel to the direction of movement of the web, relatively movable cutting blades mounted on said frame, and positively actuated means controlled by the aforesaid web of material for moving said cutting blades relatively to each other and for reciprocating said frame to and from operative position, said means including a stop and trip device connected to and movable with said frame to accurately regulate the length of the web material between the stop and the frame.

32. Shear mechanism for cutting a web of moving material, comprising a feed table having means for imparting a preliminary flexure to said web, a frame slidable in a direction parallel to the direction of movement of the web, relatively movable cutting blades mounted on said frame, a crank shaft, connections whereby the rotation of said crank shaft reciprocates said frame and moves the cutting blades relatively to each other to cut the web, and means controlled by the web for controlling the operation of the crank shaft, said means including a stop and trip device connected to and movable with said frame to accurately regulate the length of the web between the stop and frame.

33. Shear mechanism for cutting a web of moving material, comprising a feed table having means for imparting a preliminary flexure to said web, a frame slidable in a direction parallel to the direction of movement of the web, relatively movable cutting blades mounted on said frame, a crank shaft, connections between said crank shaft and frame for reciprocating the frame and moving the cutting blades relatively to each other, and positively actuated means for controlling the operation of said crank shaft, said means including a stop and trip device adjustably connected to and movable with said frame to accurately regulate the length of the web between said stop device and the frame.

34. Shear mechanism for cutting a web of moving material, comprising a feed table having means for imparting a preliminary flexure to said web, a frame slidable in a direction parallel to the direction of movement of the web, relatively movable cutting blades mounted on said frame, a crank shaft, connections between said crank shaft and frame for reciprocating the frame and moving the cutting blades relatively to each other, and positively actuated means for controlling the operation of said crank shaft, said means including a clutch, a combined stop and trip device controlling the operative engagement of the clutch and a positive connection between the combined stop and trip device and the frame to accurately regulate the length of the web between said stop device and the frame.

35. Shear mechanism for cutting a flat web of moving material, comprising a feed table having a transverse member extending above the surface thereof to impart an initial flexure to the web, a frame slidable in a direction parallel to the direction of movement of the web, relatively movable cutting blades mounted on said frame, and positively actuated means controlled by the aforesaid web of material for moving said cutting blades relatively to each other and for reciprocating said frame to and from operative position, said means including a stop and trip device connected to and movable with said frame to accurately regulate the length of the web material between the stop and the frame.

36. The combination with shearing means comprising relatively movable blades effective for transversely cutting a flat web of moving material, of a movable stop device operative to engage the leading edge of the moving web and accurately regulate the length of the latter between the stop and the shearing means, and means for automatically releasing the stop device from the web following the cutting of the latter.

37. The combination with shearing means comprising relatively movable blades effective for transversely cutting a flat web of moving material, of a stop device movable in unison with the shearing means operative to engage the leading edge of the moving web and accurately regulate the length of the latter between the stop and the shearing means.

38. The combination with shearing means comprising relatively movable blades effective for transversely cutting a flat web of moving material, of a stop connected to and movable in unison with the shearing means operative to engage the leading edge of the moving web and accurately regulate the length of the latter between the stop and the shearing means.

39. The combination with shearing means comprising relatively movable blades effective for transversely cutting a flat web of moving material, of a movable stop and trip device operative to engage the leading edge of the moving web and accurately regulate the length of the latter between the stop and the shearing means, positively acting means controlled by the movement of the trip for actuating the shearing means, and means in advance of the shearing means for imparting a flexure to the web.

40. The combination with shearing means comprising relatively movable blades effective for transversely cutting a flat web of moving material, of a movable stop and trip device operative to engage the leading edge of the moving web and accurately regulate the length of the latter between the stop and the shearing means, positively acting means controlled by the movement of the trip for actuating the shearing means, means for automatically releasing the stop device from the web following the cutting of the latter, and means in advance of the shearing means for imparting a flexure to the web.

41. The combination with shearing means effective for transversely cutting a flat web of moving material, of a movable stop device at the rear of the shearing means movable in unison with the latter and operative to engage the leading edge of the moving web and accurately regulate the length of the latter between the stop and the shearing means, and means in advance of the shearing means for clamping the web and cooperating with the stop for arresting the feed of the web relatively to the shearing means during the shearing operation.

42. The combination with shearing means effective for transversely cutting a flat web of moving material, of a stop device at the rear of the shearing means connected to and movable in unison with said shearing means and operative to engage the leading edge of the moving web and accurately regulate the length of the latter between the stop and the shearing means, and means in advance of the shearing means for clamping the web and cooperating with the stop for arresting the feed of the web relatively to the shearing means during the shearing operation.

43. The combination with shearing means effective for transversely cutting a flat web of moving material, of a movable stop device at the rear of the shearing means operative to engage the leading edge of the moving web and accurately regulate the length of the latter between the stop and the shearing means, means in advance of the shearing means for clamping the web and cooperating with the stop for arresting the feed of the web relatively to the shearing means during the shearing operation, and means in advance of the web clamping means for imparting a flexure to the web.

In testimony whereof I affix my signature.

FRANK G. FEELEY.